United States Patent
Fang et al.

(10) Patent No.: US 7,401,258 B1
(45) Date of Patent: Jul. 15, 2008

(54) CIRCUIT FOR AND METHOD OF ACCESSING INSTRUCTION DATA WRITTEN TO A MEMORY

(75) Inventors: Ying Fang, San Jose, CA (US); Mehul R. Vashi, San Jose, CA (US)

(73) Assignee: XILINX, Inc., San Jose, CA (US)

( * ) Notice: Subject to any disclaimer, the term of this patent is extended or adjusted under 35 U.S.C. 154(b) by 630 days.

(21) Appl. No.: 10/956,599

(22) Filed: Sep. 30, 2004

(51) Int. Cl.
G06F 11/00 (2006.01)
(52) U.S. Cl. ....................................................... 714/30
(58) Field of Classification Search ..................... 714/30
See application file for complete search history.

(56) References Cited

U.S. PATENT DOCUMENTS

| | | | | |
|---|---|---|---|---|
| 5,230,073 | A | * | 7/1993 | Gausmann et al. .............. 707/3 |
| 2001/0009022 | A1 | * | 7/2001 | Feierbach ................... 711/106 |
| 2004/0257874 | A1 | * | 12/2004 | Tanaka et al. .......... 365/185.09 |
| 2005/0193358 | A1 | * | 9/2005 | Blodget et al. ................. 716/17 |
| 2005/0286506 | A1 | * | 12/2005 | LaBerge ...................... 370/363 |
| 2007/0109858 | A1 | * | 5/2007 | Conley et al. .......... 365/185.11 |

OTHER PUBLICATIONS

U.S. Appl. No. 10/319,051, filed Dec. 13, 2002, Curd et al.
U.S. Appl. No. 10/912,844, filed Aug. 6, 2004, Ansari et al., entitled "Coprocessor Interface Controller", Xilinx, Inc. 2100 Logic Drive, San Jose, California.
U.S. Appl. No. 10/912,897, filed Aug. 6, 2004, Ansari et al., entitled "Decoder Interface", Xilinx, Inc. 2100 Logic Drive, San Jose, California.
U.S. Appl. No. 10/913,991, filed Aug. 6, 2004, Purcell et al., entitled "Processor-Controller Interface for Non-Lock-Step Operation", Xilinx, Inc. 2100 Logic Drive, San Jose, California.
U.S. Appl. No. 10/913,282, filed Aug. 6, 2004, Ansari et al., entitled "Access to a Bank of Registers of a Device Control Register Interface Using a Single Address", Xilinx, Inc. 2100 Logic Drive, San Jose, California.
U.S. Appl. No. 10/912,865, filed Aug. 6, 2004, Purcell et al., entitled "Tracking an Instruction Through a Processor Pipline", Xilinx, Inc. 2100 Logic Drive, San Jose, California.
U.S. Appl. No. 10/913,231, filed Aug. 6, 2004, Ansari et al., entitled "Method and System for Handling an Instruction Not Supported in a Coprocessor Formed Using Configurable Logic", Xilinx, Inc. 2100 Logic Drive, San Jose, California.

* cited by examiner

*Primary Examiner*—Bryce P Bonzo
(74) *Attorney, Agent, or Firm*—John J. King (57) ABSTRACT

According to one embodiment of the invention, a method of accessing instruction data from a memory comprises steps of specifying a predetermined address of a memory for storing instruction data; writing instruction data to the predetermined address in the memory; reading the instruction data from the predetermined address after the step of writing instruction data; and determining whether the instruction data is valid. According to another embodiment of the invention, a method describes a method of accessing instruction data from a memory by way of first and second data buses. According to a further embodiment, instruction data read back from the memory is multiplexed to a memory controller. A circuit for accessing instruction data written to a memory is also described.

27 Claims, 7 Drawing Sheets

CIRCUIT FOR AND METHOD OF ACCESSING INSTRUCTION DATA WRITTEN TO A MEMORY

FIELD OF THE INVENTION

The present invention relates generally to a memory device, and in particular, to a circuit for and method of accessing instruction data written to a memory.

BACKGROUND OF THE INVENTION

Memory devices are used for a wide variety of applications in electronic devices, and are used to store different types of information, such as data or instructions. When loading instructions, it is important that the instructions are loaded and stored in a memory properly. One common application for employing memory is in programmable logic devices, such as a field programmable gate array (FPGA) or complex programmable logic device (CPLD), for example. If instruction data loaded in a memory is corrupted, a circuit relying on the instruction data may not function properly. Therefore, it is important to verify that instruction data loaded to a memory is loaded and stored properly.

Figure 1:
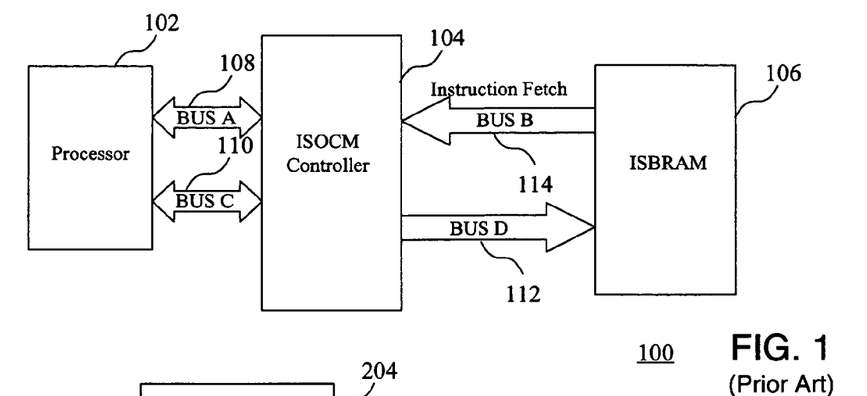
FIG. 1 is a block diagram of a conventional circuit for accessing instruction data written to a memory.

In conventional devices incorporating memory, an instruction side on-chip memory (ISOCM) interface is used primarily to fetch instructions from an instruction side Block RAM (ISBRAM) attached to it. Instructions may be loaded into the ISBRAM, either during configuration of a programmable logic device or using a dedicated register on a device control register (DCR) bus. As shown in FIG. 1, a conventional integrated circuit having memory comprises a processor 102 which issues a request to perform an instruction fetch starting from a specific ISOCM memory location. The ISOCM controller 104 detects this request, translates the request into control signals for ISBRAM 106, and controls the ISBRAM to perform an instruction fetch. Thus, the ISOCM controller receives instructions from the ISBRAMS via BUS B, and then sends the instructions on the BUS A, so that the processor can execute the instruction.

When there is a write access on BUS C (i.e. the processor gives signals indicating that it will write instructions into ISBRAM using the DCR bus), the ISOCM controller detects the write instructions, and translates them to perform an instruction write. Along with ISBRAM specific, write control signals, the data to be written to ISBRAM also gets transferred onto BUS D. Accordingly, a user can use DCR access to write into the ISBRAM array in such conventional devices. For each write to the ISBRAM, the ISOCM controller writes into the ISBRAM, and increases the address for ISBRAM address, as will be described in more detail below with respect to FIG. 3.

Figure 2:
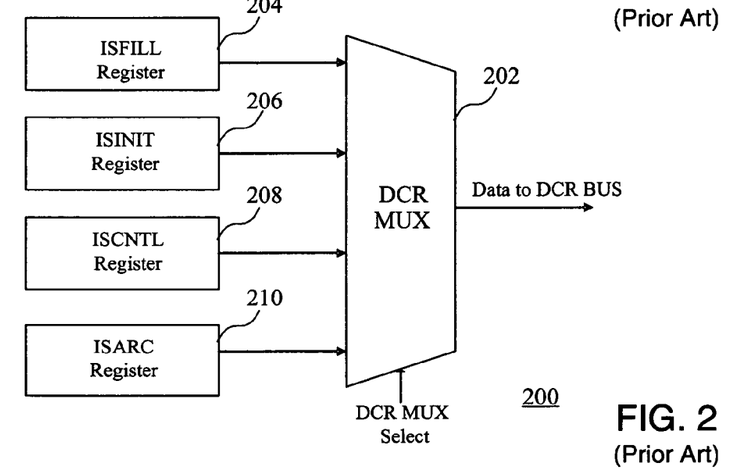
FIG. 2 is a block diagram of a conventional circuit for coupling data to a DCR bus.

As shown in FIG. 2, a conventional DCR multiplexer 202 selects data from one of a plurality of instruction side registers. In particular, an ISFILL register 204 couples data stored in the ISFILL register to DCR multiplexer 202. Similarly, an ISINIT register 206 couples the initial address to DCR multiplexer 202. An ISCNTL register 208 couples any required control signals to DCR multiplexer 202. Finally, an ISARC register 210 is a DCR register that stores 8 bit of address specified by user. It is used to compare with the upper 8 bits of address that the processor provides to the ISOCM controller. In the ISOCM controller, the upper 8 bits of the processor address are compared with the 8-bits in ISARC. If they match, that piece of the address sent by the processor is within the ISOCM memory space, and the controller will let the instruction side on-chip memory respond to the processor commands. Otherwise, the ISOCM will just ignore the command.

Figure 3:
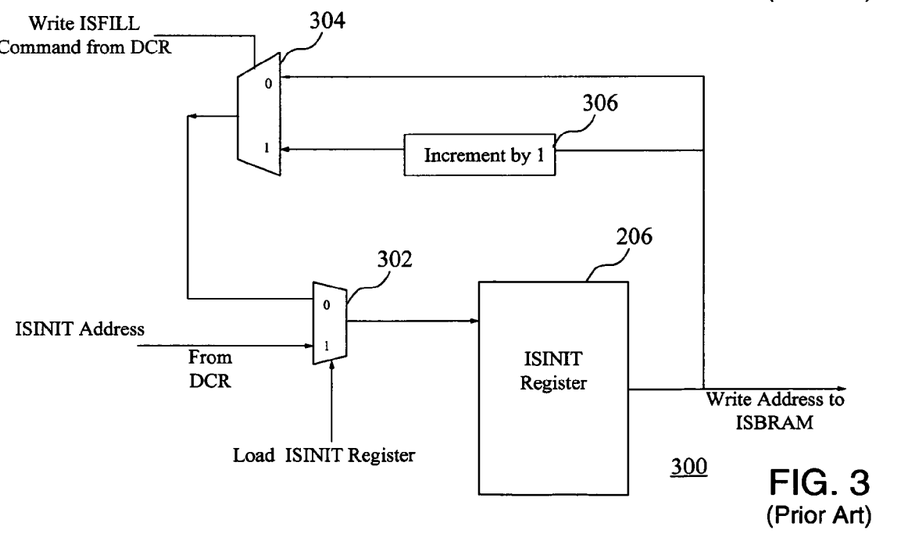
FIG. 3 is a block diagram of a conventional circuit for providing an address to a memory to provide write access via a DCR bus.

As shown in FIG. 3, a conventional circuit for writing an address to the ISBRAM is shown. In particular, an initial address received from the DCR is coupled to a multiplexer 302. The multiplexer receives a load ISINIT register signal to select to receive either the address from the DCR or an output of a second multiplexer 304, which selects an address which may be incremented by 1, as a result of the Increment by 1 block 306. That is, multiplexer 304 receives a Write ISFILL Command from the processor to determine whether the address is to be retained in the ISINIT Register, or the address is to be incremented by 1.

In order to make sure that the instruction contents of the ISBRAM are written acurately, the instruction data must be verified. In conventional devices incorporating memory devices, it is difficult to provide a software based debugging of the memory device. As processor executes instructions, if a program results in an error or illegal instruction, it is hard for a user to debug since the instruction is fetched from ISBRAMs and fed to the instruction register by way of a bus for fetching instructions. The only known method to read contents of a memory (e.g. BRAM) that serves as an instruction side on-chip memory in an FPGA is using soft FPGA IP based techniques. That is, a user would typically access the contents of the memory by way of a processor local bus, and read the contents through an arbiter and a BRAM controller. However, such techniques, which are well known in the art, result in lower performance and high area overhead. Since it is not very practical to implement soft IP based solutions, an FPGA bitstream read back mechanism is often used to read the contents of ISBRAMs. However, such a bitstream read back mechanism cannot be used with the software debugging tools.

Accordingly, there is a need for a circuit for and method of accessing instruction data written to a memory to read back and verify the instruction contents of a memory.

SUMMARY OF THE INVENTION

According to one embodiment of the invention, a method of accessing instruction data from a memory comprises steps of specifying a predetermined address of a memory for storing instruction data; writing instruction data to the predetermined address in the memory; reading the instruction data from the predetermined address after the step of writing instruction data; and determining whether the instruction data is valid. The method may further comprise a step of receiving a write request signal for the instruction data from a processor at a memory controller. According to another embodiment of the invention, a method describes accessing instruction data from a memory by way of first and second data buses. According to a further embodiment, instruction data read back from the memory is multiplexed to a memory controller.

A circuit for accessing instruction data written to a memory is also described. The circuit comprises a memory controller; a memory coupled to the memory controller and storing instruction data for the integrated circuit; and a bus coupled between the memory controller and the memory. The bus provides instruction data to be written to the memory and to be read back from the memory to the memory controller. The circuit may further comprise an embedded processor coupled to the memory controller.

DETAILED DESCRIPTION OF THE DRAWINGS

Figure 4:
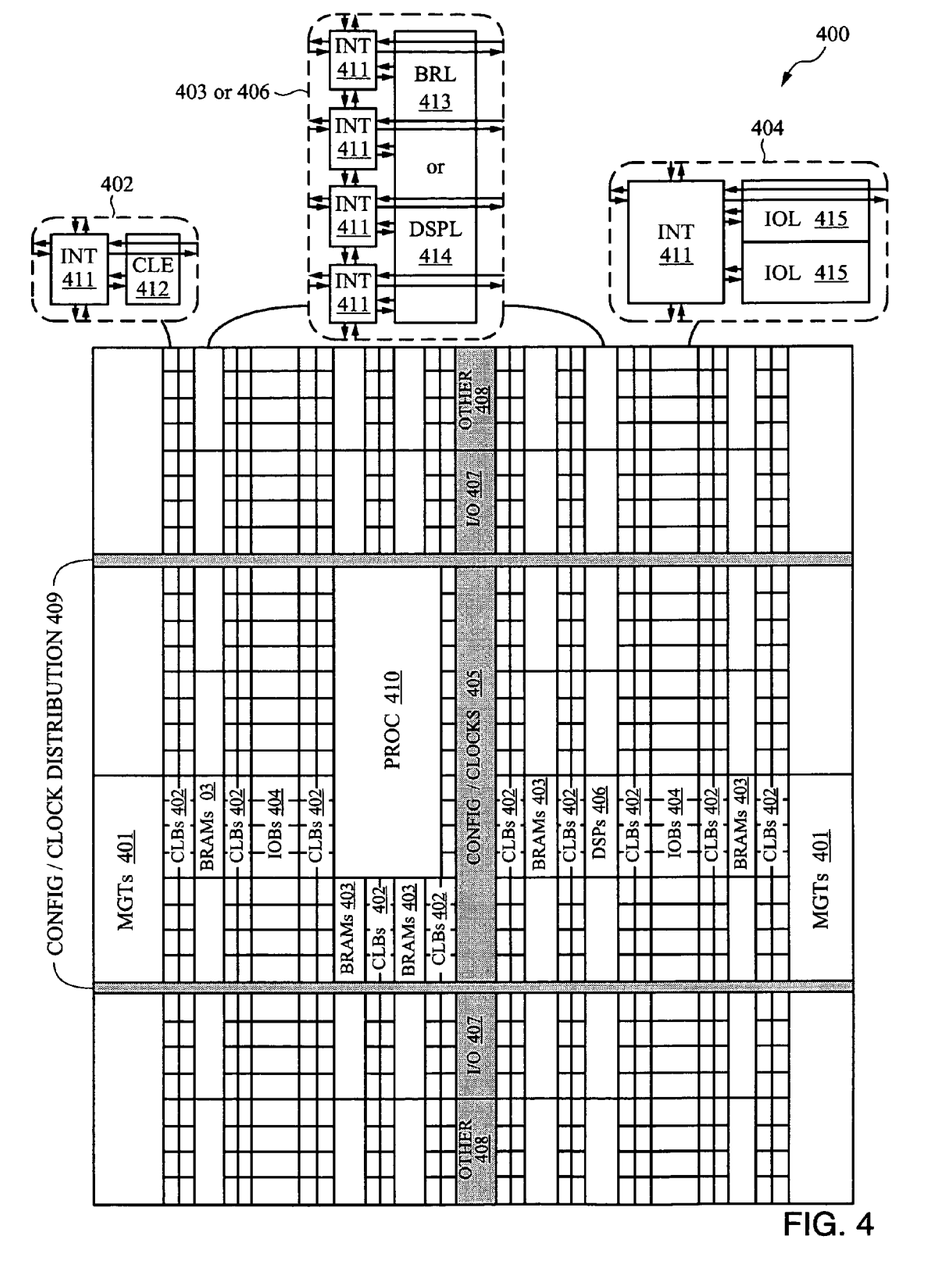
FIG. 4 is a block diagram of a circuit for implementing circuit and methods according to an embodiment of the present invention.

Turning first to FIG. 4, a block diagram of a circuit for implementing circuit and methods according to an embodiment of the present invention is shown. As noted above, advanced FPGAs can include several different types of programmable logic blocks in the array. For example, FIG. 4 illustrates an FPGA architecture 400 that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407) (e.g., configuration ports and clock ports), and other programmable logic 408 such as digital clock managers, analog-to-digital converters, system monitoring logic, and so forth. Some FPGAs also include dedicated processor blocks (PROC 410).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA.

The programmable interconnect element (INT 411) also includes the connections to and from the programmable logic element within the same tile, as shown by the examples included at the top of FIG. 4.

For example, a CLB 402 can include a configurable logic element (CLE 412) that can be programmed to implement user logic plus a single programmable interconnect element (INT 411). A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element (INT 411). As will be clear to those of skill in the art, the actual I/O pads connected, for example, to the I/O logic element 415 are manufactured using metal layered above the various illustrated logic blocks, and typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMS.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic.

Figure 5:
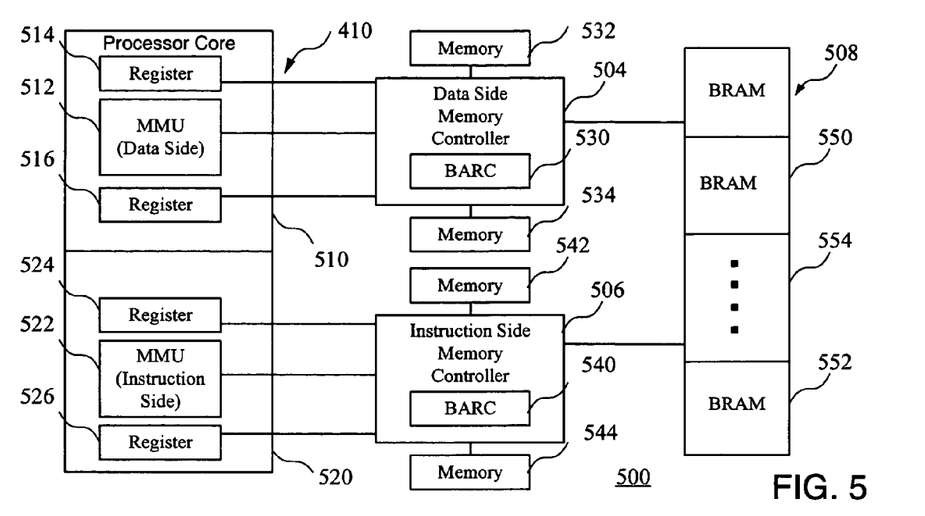
FIG. 5 is a block diagram of circuit for controlling a memory according to an embodiment of the present invention.

Turning now to FIG. 5, a block diagram of circuit for controlling a memory according to an embodiment of the present invention is shown. In the circuit for accessing a memory according to one embodiment of the present invention, a separate user configurable memory controller is preferably used for a data side and an instruction side, as shown in FIG. 5. In particular, a processor 410 is coupled to a data side memory controller 504 and an instruction side memory controller 506, each of which interface with a memory, such as a block of BRAMs 508. Accordingly, the processor also comprises a separate data side 510 and instruction side 520. Data side 510 preferably comprises a memory management unit 512 and two registers 514 and 516. Registers 514 and 516 generally store wait states which can be set either via hardware or software. The value of the registers, and thus the number of wait states, may be changed repeatedly anytime after configuration. Instruction side 520 also comprises a memory management unit 522 and two registers 524 and 526. The data side memory controller 504 contains a base address register 530 and memories 532 and 534 while instruction side memory controller 506 contains a base address register 540 and memories 542 and 544. Finally, BRAMs 508 comprise a portion 550 which is used for data, another portion 552 which is used for instructions, and a remaining portion 554 may be used for other purposes. Portions 550, 552, and 554 may have different address depths and memory sizes.

Figure 6:
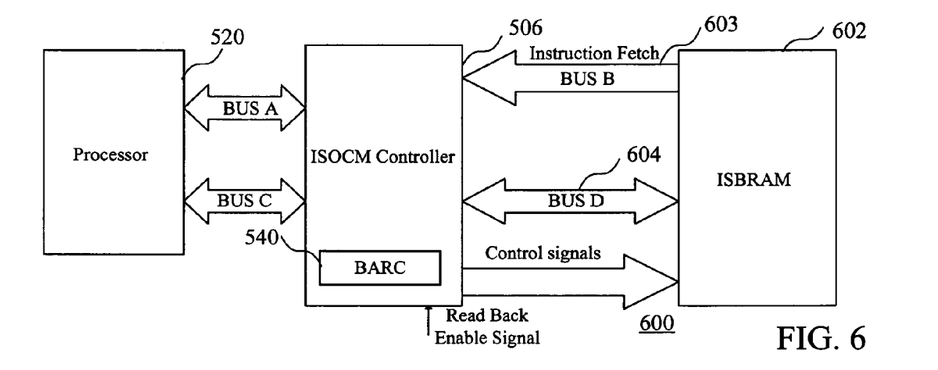
FIG. 6 is a block diagram of a circuit for controlling a memory according to an embodiment of the present invention.

Turning now to FIG. 6, a block diagram of a circuit for controlling a memory according to an embodiment of the present invention is shown. In particular, an ISBRAM 602 is coupled to the ISOCM Controller 506 by a plurality of buses, including Bus 603 for fetching instructions, and a bidirectional bus 604 (i.e. a modified Bus D) for writing instruction data to the ISBRAM 602, and receiving instruction data back at the ISOCM Controller 506. Unlike conventional circuits for writing instruction data to a memory, the bidirectional bus 604 enables both writing of the instruction data to the memory, and reading instruction data back. Further, a control bus provides control signals from the ISOCM Controller 506 to the ISBRAM 602. That is, as will be described in more detail in reference to the remaining figures, the control signals enable the reading back of instruction data written to the memory. Finally, a read back enable signal enables or disables the read back feature of the present invention. A user may enable or disable the instruction read back feature by setting control register bit through a software or hardware programmable signal, for example, and which could be a single bit of data.

Figure 7:
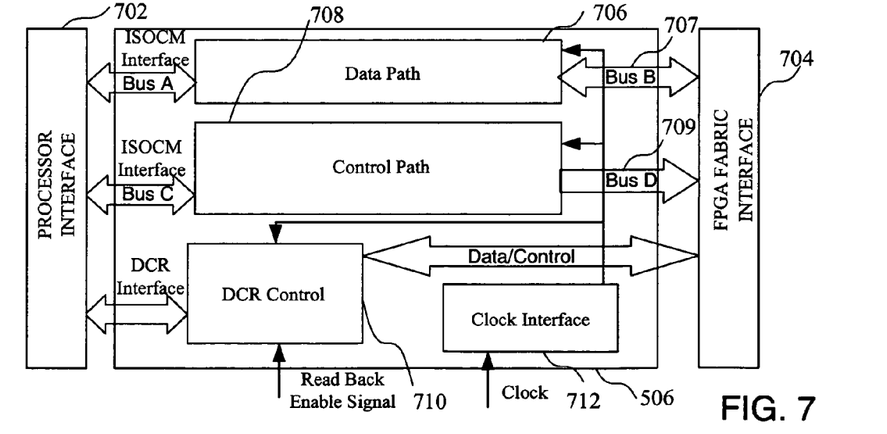
FIG. 7 is a block diagram of a circuit of a memory controller according to an embodiment of the present invention.

Turning now to FIG. 7, a block diagram of a circuit of a memory controller according to an embodiment of the present invention is shown. According to one aspect of the invention, a hardware circuit enables reading back of the contents of ISBRAMs in a programmable logic device. The mechanism to read-back the contents of ISBRAMs is preferably implemented in two stages. In the first stage, a device control register (DCR) bus, coming from processor is used to provide the necessary commands and control signals to Instruction-Side On Chip Memory (ISOCM) controller. In the second stage, the ISOCM controller converts these commands and controls into ISBRAM specific data read requests. This feature prefereably uses a conventional DCR Bus interface to the ISOCM controller, and adds a new set of signals to interface with ISBRAMs.

Referring specifically to FIG. 7, a processor interface 702 and a FPGA fabric interface 704 provide the appropriate interfaces between the ISOCM controller 506 and the processor 520 and the ISBRAM 602, respectively. The processor interface 702 enables communication with a data path 706 by way of Bus A and communication with a control path by way of Bus C. Similarly, the FPGA fabric interface 704 enables communication with the data path 706 by way of a Bus 707 which includes an instruction fetch bus and enables communication with the control path 708 by way of the bus 709. The ISOCM controller 506 also includes a DCR Controller 710 which receives a read back enable signal and enables the reading back of instruction data loaded to the ISBRAM 602, as will be described in more detail in reference to FIGS. 8 and 9. Finally, a clock interface 712, which receives an external clock such as the processor clock, provides a clock signal to the data path 706, the control path 708 and the DCR Controller 710.

The circuit of FIG. 7 provides a seamless way of interfacing with software debugging tools by automatically coupling instruction data written to the ISBRAM if the read back enable feature of an embodiment of the present invention is enabled. Accordingly, the circuit enables software based debugging of ISBRAM contents, and enables the end user to enable the software debugging feature. As in conventional devices, instructions fetched from ISBRAMs can be fed directly to the instruction register as instructions. However, the circuit of an embodiment of the present invention adds a feature that uses the DCR bus to access the ISBRAM, specifies the initial address of the ISBRAM, and performs a DCR read access to read back the content of the ISBRAM as data. That is, rather than reading back the instructions on a bus for fetching instructions, the circuit of an embodiment of the present invention reads back instructions as data on the DCR bus. Accordingly, users can easily validate the instruction using the processor's assembly language, and debug them using software.

Figure 8:
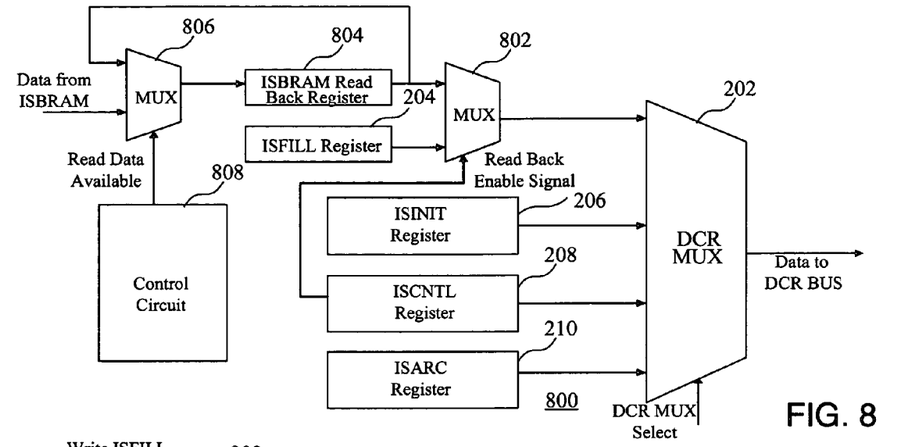
FIG. 8 is a block diagram of a circuit for coupling data to a processor on a DCR bus according to an embodiment of the present invention.

Turning now to FIG. 8, a block diagram of a circuit for coupling data to a processor on the DCR bus according to an embodiment of the present invention is shown. As shown in FIG. 8, additional logic is provided to control the reading back of data on to the DCR bus from the ISBRAM. The additional logic allows the reading back of the contents of the ISBRAM as data, in response to a newly supported read access command issued by processor via BUS C of FIG. 6. That is, the DCR controller controls the instruction data that was previously written to the ISBRAM, returns the instruction data from the ISBRAM via the bidirectional bus 604, and transfers it back onto BUS C of FIG. 6 to be coupled to the processor.

In particular, a multiplexer 802 receives the read back enable signal to select either data in the ISFILL register 204 or data in the ISBRAM read back register 804 to be coupled to the DCR bus by way of the DCR multiplexer 202. That is, if the read back enable signal is valid, instruction data from the ISBRAM read back register 804 is coupled to the DCR bus and provided to the processor to determine whether the instruction data is valid. An additional multiplexer 806 ensures that the data in the ISBRAM is stable. In particular, the ISBRAM read back register 804 receives data from the ISBRAM or the ISBRAM read back register 804, depending upon whether data from the ISBRAM is available. Accordingly, a control circuit 808 generates a valid read data available signal when instruction data read back from the ISBRAM is stable. However, if the read back enable signal is not selected, instruction data from the ISFILL register 204 is selected by multiplexer 802.

Figure 9:
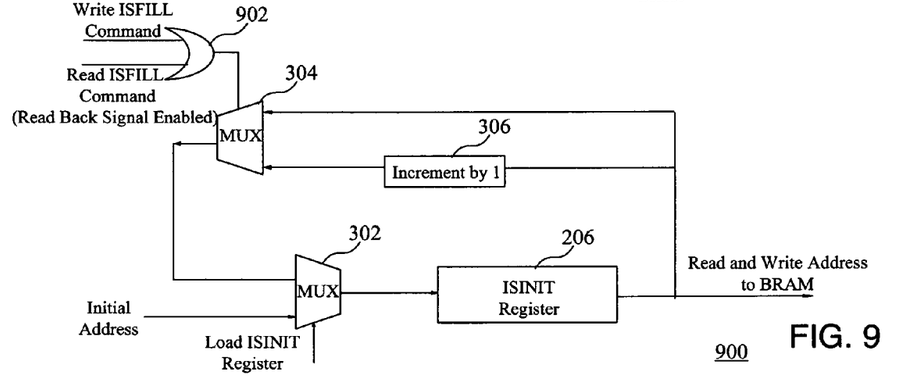
FIG. 9 is a block diagram of a circuit for providing an address to read or write instruction data to a memory according to an embodiment of the present invention.

Turning now to FIG. 9, a block diagram of a circuit for providing an address to read or write instruction data to a memory according to an embodiment of the present invention is shown. In order to support instruction read back via DCR access, the ISOCM controller logic is implemented in such a way that it allows a user to first write to the ISINIT register of the DCR controller to specify the initial address for reading instruction data from the ISBRAM, and then perform a DCR read, which results in the instructions that were previously written to the ISBRAM to be automatically read back. In particular, an OR gate 902 is coupled to receive a write ISFILL command and a read ISFILL command (assuming that the read back enable signal is valid) from the processor by way of the DCR bus. That is, if a write ISFILL command is received from the processor, the write address provided to the ISBRAM will be incremented. Alternatively, if a Read ISFILL command (assuming that the read back enable signal is valid) is received from the processor, the read address to the ISBRAM for reading back the instruction data will be incremented.

Figure 10:
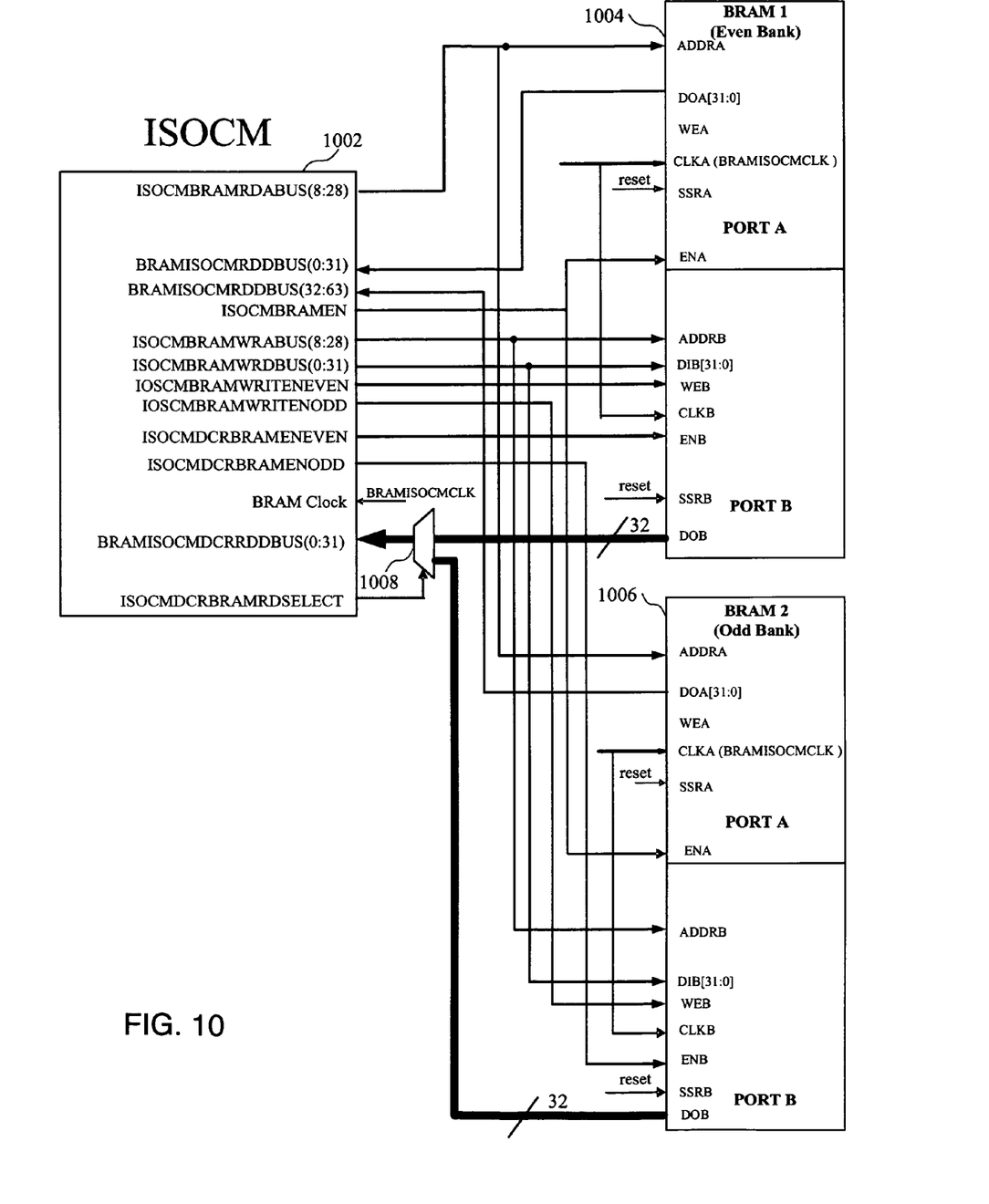
FIG. 10 is a diagram showing the transfer of signals between a memory controller and a memory according to an embodiment of the present invention.

Turning now to FIG. 10, a diagram shows the transfer of signals between a memory controller and a memory according to an embodiment of the present invention. Signals are provided from ISOCM controller 1002 to port A to perform an instruction fetch from port A of the BRAM 1004 and BRAM 1006. As shown, one BRAM is used for an even bank, and another BRAM is used for an odd bank. In particular, an instruction side on-chip memory BRAM read address bus (ISOCMBRAMRDABUS(8:28)) provides an address to port A. When port A is enabled by an instruction side on-chip memory BRAM enable (ISOCMBRAMEN) signal, the data can be read from port A by way of a BRAM instruction side on-chip memory read data bus. The ISOCM fetches instructions from a Port A of BRAM1 by way of a data bus (BRAMISOCMRDDBUS(0:31)) and data from a port A of BRAM2 by way of another bus (BRAMISOCMRDDBUS(32:63)). Similarly, signals are provided from the ISOCM controller 1002 to port B of the BRAM 1004 and port B of BRAM 1006 to enable writing data to a BRAM via a DCR bus or reading back instructions as data via the DCR bus. In particular, an instruction side on-chip memory BRAM read/write address bus (ISOCMBRAMWRABUS(8:28)) provides a read/write address for reading/writing to port B of BRAM1 or BRAM2. Read/Write access of ports B of BRAM1 and BRAM2 is controlled by the ISOCMBRAMWRITENEVEN and ISOCMBRAMWRITENODD signals. Data is written to port B by way of an instruction side on-chip memory BRAM write data bus (ISOCMBRAMWRDBUS(8:28)). Separate enable signals (ISOCMBRAMWRITENEVEN and ISOCMBRAMWRITENODD) are also provided to port B of BRAM1 to write data to port B of BRAM1 for an even bank and to port B of BRAM2 to write data to port B of BRAM2 for an odd bank.

According to one aspect of the invention, ISOCM controller 1002 couples additional signals to the BRAM 1004 to enable reading back of the instruction data written to the BRAM. In particular, an instruction side on-chip memory DCR BRAM enable signal (ISOCMDCRBRAMEN) is coupled to enable either reading or writing to port B of a BRAM. In order to read back data from port B of BRAM1 or BRAM2, separate DCR BRAM enable signals are provided to port B of BRAM1 and BRAM2. Also, a BRAM instruction side on-chip memory DCR read data bus (BRAMISOCMDCRRDDBUS) is provided to read back the data written to port B of the BRAM. The data bus is preferably a 64 bit bus, enabling reading back two 32 bit instructions per clock cycle from BRAM1 and BRAM2. A multiplexer 1008 is preferably provided to enable the selection of one of the instructions. That is, an instruction side on-chip memory DCR BRAM read select (ISOCMDCRBRAMRDSELECT) signal is coupled to the multiplexer to couple a single 32 bit instruction to the ISOCM from BRAM1 or BRAM2.

The BRAM port B read/write is controlled by WEB and ENB. ENB is the enable bit for Port B, and must be valid to enable a read or write to Port B. When WEB is active, and ENB is active, port B performs a write to the specific address provided by ADDRB, and data specified by DIB. When WEB is inactive, and ENB is active, Port B performs a read. The read address is specified by ADDRB, and the read back data is on bus DOB. As can be seen, separate WEB and ENB signals are provided to the Port B of BRAM1 for instruction data in the even bank and BRAM2 for instruction data in the odd bank.

Figure 11:
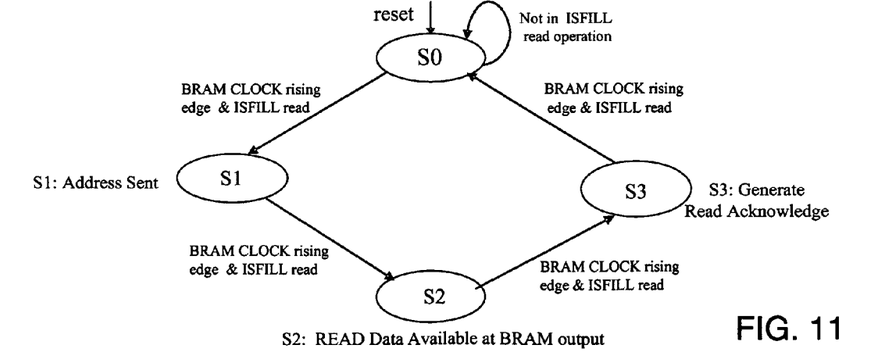
FIG. 11 is a state diagram showing states of reading instruction data according to an embodiment of the present invention.

Turning now to FIG. 11, a state diagram shows states of control signals for reading back instruction data according to an embodiment of the present invention. In particular, at a state S0, a circuit for controlling reading back of instruction data written to a memory determines that it is not currently in an ISFILL read operation. The circuit is then at a state S1 when a read address is sent on the rising edge of a BRAM clock after an ISFILL read command is received from the processor. The circuit is then at a state S2 when read data is available at the BRAM output. Finally, the circuit is at a state S3 when a read acknowledge is generated.

Figure 12:
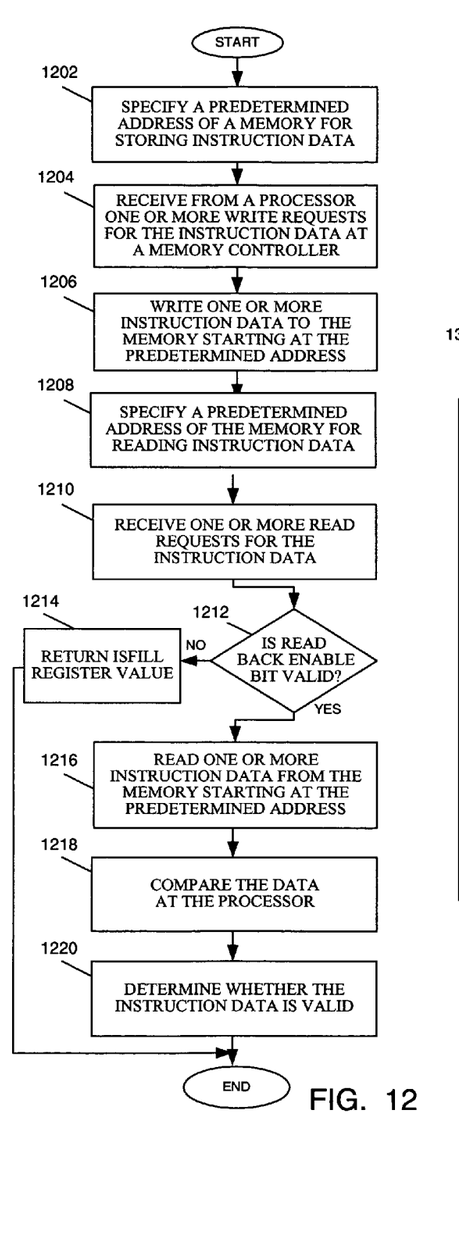
FIG. 12 is a flow chart showing a method of reading back instruction data according to an embodiment of the present invention.

Turning now to FIG. 12, a flow chart shows a method of reading back instruction data according to an embodiment of the present invention. The method of FIG. 12, as well as the methods of FIGS. 13 and 14 could be implemented with any of the circuits described above and software for implementing the circuits, or any other suitable circuit and software. In particular, in order to read back instruction data according to an embodiment of the present invention, a predetermined address of a memory is specified for storing instruction data at a step 1202. When one or more write requests are received from a processor for the instruction data at a memory controller, for example on Bus C of FIG. 6, at a step 1204, the instruction data is written to the memory starting at the predetermined address in the memory at a step 1206. A predetermined address of the memory is then specified for reading instruction data at a step 1208. One or more read requests are then received for the instruction data at step 1210. The address could be the same address as the predetermined address of step 1202, or some other address. It is then determined whether a read back enable signal is valid at a step 1212. If not, the ISFILL register value is returned at a step 1214. Otherwise, one or more instruction data is read from the memory starting at the predetermined address at a step 1216. The instruction data is then compared to the original instruction data that was intended to be stored in the memory at a step 1218. This comparison is preferably performed by a processor. The comparison could be, for example, a bit by bit comparison of the instruction data to the original instruction data that was intended to be stored. Alternatively, the instruction data could be compiled by the processor to determine whether the instruction data that was stored to the memory is correct. It is then determined whether the instruction data is valid at a step 1220 based upon the step of comparing the data at the step 1218.

Figure 13:
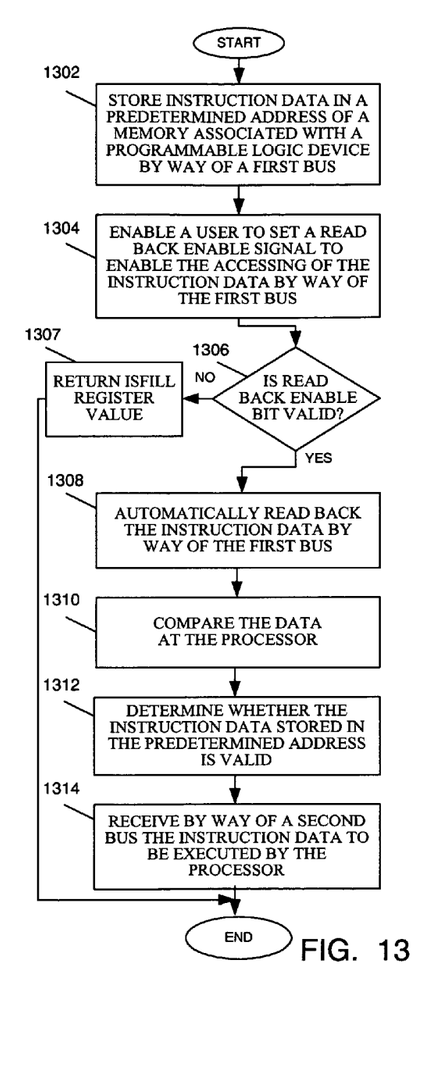
FIG. 13 is a flow chart showing a method of accessing instruction data by way of a plurality of buses according to an embodiment of the present invention.

Turning now to FIG. 13, a flow chart shows a method of accessing instruction data by way of a plurality of buses according to an embodiment of the present invention. In particular, instruction data is stored in a predetermined address of a memory associated with a programmable logic device by way of a first bus such as a Bus D of FIG. 6 for writing instructions at a step 1302. A read back enable signal is received at a step 1304 to enable the accessing of the instruction data by way of the first bus. The read back enable signal could be received for example by an instruction side on-chip memory controller, such as ISOCM controller 506. It is then determined whether the read back enable bit is valid at a step 1306. If not, the ISFILL register value is returned at a step 1307. The instruction data is then preferably automatically read back by way of the first bus at a step 1308, and the contents of the instruction data is then compared to the original instruction data that was intended to be stored in the memory at a step 1310. It is then determined whether the instruction data stored in the predetermined address is valid at a step 1312 based upon the comparison. Finally, the instruction data is received by way of a second bus, such as Bus B of FIG. 6, to be executed by a processor at a step 1314.

Figure 14:
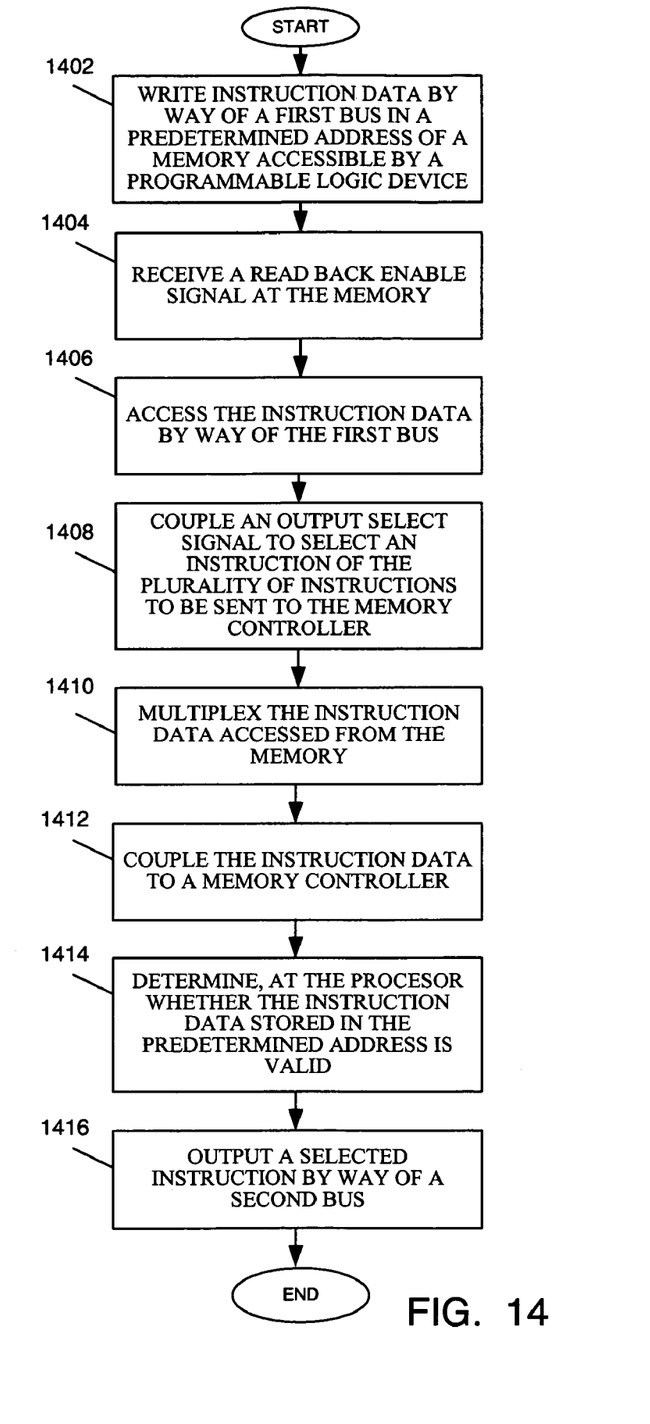
FIG. 14 is a flow chart showing a method of multiplexing instruction data to a memory controller according to an embodiment of the present invention.

Turning now to FIG. 14, a flow chart shows a method of multiplexing instruction data to a memory controller according to an embodiment of the present invention. The multiplexing of instruction data read back to a memory controller could be implemented using the signals described in reference to FIG. 10, for example. In particular, instruction data is written in a predetermined address of a memory accessible by a programmable logic device at step 1402. A read back enable signal is received at the memory at a step 1404. The read back enable signal could be received for example by an instruction side on-chip memory controller, such as ISOCM controller

506. The instruction data is then accessed at a step 1406. An output select signal is coupled to select an instruction of the plurality of instructions to be sent to the memory controller at a step 1408. The instruction data accessed from the memory is then multiplexed, for example by multiplexer 1008, at a step 1410. The instruction data is coupled to a memory controller at a step 1412. It is then determined whether the instruction data stored in the predetermined address is valid at a step 1414. A selected instruction is then output, by way of a bus for fetching instructions to be executed for example, at a step 1416.

It can therefore be appreciated that the new and novel circuit and method of accessing instruction data written to a memory has been described. It will be appreciated by those skilled in the art that, particular to the teaching herein, numerous alternatives and equivalents will be seen to exist which incorporate the disclosed invention. As a result, the invention is not to be limited by the foregoing embodiments, but only by the following claims.

The invention claimed is:

1. A method of accessing instruction data from a memory of an integrated circuit having an on-chip memory controller coupled to a processor of said integrated circuit, said method comprising the steps of:
    specifying a predetermined address of a block of random access memory of said integrated circuit for storing instruction data;
    writing instruction data to said predetermined address in said block of random access memory by way of said on-chip memory controller;
    automatically reading said instruction data by way of said on-chip memory controller from said predetermined address after said step of writing instruction data;
    determining whether said instruction data is valid;
    receiving a read request from said processor for said instruction data;
    reading said instruction data from said block of random access memory; and
    executing said instruction data on said processor.

2. The method of claim 1 further comprising a step of receiving a write request signal for said instruction data from said processor at said on-chip memory controller.

3. The method of claim 1 wherein said step of automatically reading said instruction data after said step of writing instruction data comprises a step of receiving a predetermined address of said block of random access memory for reading back said instruction data.

4. The method of claim 1 wherein said step of determining whether said instruction data is valid comprises a step of comparing said data read from said block of random access memory to original instruction data that was intended to be stored.

5. A method of accessing instruction data from a memory of an integrated circuit having an on-chip memory controller coupled to a processor of said integrated circuit, said method comprising the steps of:
    storing instruction data by way of said on-chip memory controller using a first bus in a predetermined address of a memory associated with a programmable logic device;
    accessing said instruction data from said memory by way of said first bus;
    determining whether said instruction data received by way of said first bus is valid;
    receiving said instruction data to be executed by said processor by way of said on-chip memory controller using a second bus; and
    executing said instruction data received by way of said on-chip memory controller using said second bus.

6. The method of claim 5 further comprising a step of receiving a read back enable signal to enable said step of accessing said instruction data by way of said first bus.

7. The method of claim 6 wherein said step of accessing said instruction data by way of said first bus comprises a step of reading data from a read back register if said read back enable signal is valid.

8. The method of claim 5 wherein said step of accessing said instruction data by way of said first bus comprises a step of automatically reading back said instruction data after said instruction data is stored in said predetermined location.

9. The method of claim 5 wherein said step of determining whether said instruction data stored in said predetermined address is valid comprises a step of reading the contents of said instruction data.

10. A method of accessing instruction data from a memory, said method comprising the steps of:
    writing instruction data by way of a first bus in a predetermined address of a memory accessible by a programmable logic device;
    receiving a read back enable signal at said memory;
    accessing said instruction data by way of said first bus;
    multiplexing said instruction data accessed from said memory and coupling a plurality of instructions of said instruction data to a memory controller; and
    determining whether said instruction data stored in said predetermined address is valid.

11. The method of claim 10 further comprising a step of coupling an output select signal to select an instruction of said plurality of instructions to said memory controller.

12. The method of claim 11 further comprising a step of outputting a selected instruction by way of a second bus.

13. An integrated circuit having a circuit for accessing instruction data written to a memory of said integrated circuit, said circuit comprising:
    an on-chip memory controller;
    a memory coupled to said on-chip memory controller, said memory storing instruction data for said integrated circuit;
    a first bus coupled between said on-chip memory controller and said memory, said first bus providing instruction data to be written to said memory and automatically providing said instruction data written to said memory back to said on-chip memory controller; and
    a processor coupled to said on-chip memory controller, said processor executing said instruction data accessed in response to a request from said processor.

14. The integrated circuit of claim 13 wherein said on-chip memory controller comprises an instruction side memory controller and wherein said instruction side memory controller is coupled to said processor.

15. The integrated circuit of claim 13 wherein said on-chip memory controller comprises a read back register.

16. The integrated circuit of claim 15 wherein said on-chip memory controller comprises an ISFILL register.

17. The integrated circuit of claim 16 further comprising a multiplexer coupled to said read back register and said ISFILL register, said multiplexer selecting data from said read back register and said ISFILL register.

18. An integrated circuit having a circuit for accessing instruction data written to a memory of said integrated circuit, said circuit comprising:

an on-chip memory controller;

a memory coupled to said on-chip memory controller, said memory storing instruction data to be executed by said integrated circuit;

a first bus coupled between said on-chip memory controller and said memory, said first bus providing instruction data to be written to said memory and returning said instruction data written to said memory to said on-chip memory controller; and a second bus coupled between said on-chip memory controller and said memory, said second bus providing said instruction data to be executed by said integrated circuit.

19. The integrated circuit of claim 18 wherein said on-chip memory controller comprises an address control circuit.

20. The integrated circuit of claim 19 further comprising a read back register coupled to said first bus.

21. The integrated circuit of claim 20 wherein said address control circuit comprises a multiplexer circuit coupled to receive data from said memory and data from said read back register.

22. The integrated circuit of claim 21 further comprising a second multiplexer circuit coupled to receive the output of said first multiplexer circuit and contents of an ISFILL register.

23. An integrated circuit having a circuit for accessing instruction data written to a memory of said integrated circuit, said circuit comprising:

an on-chip memory controller comprising a read back register;

a memory coupled to said on-chip memory controller;

a bus coupled between said on-chip memory controller and said memory, said bus coupling instruction data written to said memory back to said on-chip memory controller; and a multiplexer coupled to said bus, said multiplexer enabling the selection of instruction data read back from said memory and stored in said read back register and data to be stored in said memory.

24. The integrated circuit of claim 23 further comprising a programmable logic circuit interface circuit coupled to said on-chip memory controller.

25. The integrated circuit of claim 24 further comprising a programmable logic circuit coupled to said programmable logic circuit interface circuit.

26. The integrated circuit of claim 23 further comprising a microprocessor interface circuit coupled to said on-chip memory controller.

27. The integrated circuit of claim 26 further comprising a microprocessor coupled to said microprocessor interface circuit.

* * * * *